June 7, 1966 J. CHRISTOFFERSON 3,255,301

TRUSS BRIDGE FOR A HIGH VOLTAGE TERMINAL

Filed Jan. 16, 1963 4 Sheets-Sheet 1

TRUSS BRIDGE FOR A HIGH VOLTAGE TERMINAL

Filed Jan. 16, 1963 4 Sheets-Sheet 2

June 7, 1966 J. CHRISTOFFERSON 3,255,301

TRUSS BRIDGE FOR A HIGH VOLTAGE TERMINAL

Filed Jan. 16, 1963 4 Sheets-Sheet 3

United States Patent Office 3,255,301 Patented June 7, 1966

3,255,301

TRUSS BRIDGE FOR A HIGH VOLTAGE TERMINAL

James Christofferson, West Newbury, Mass., assignor to High Voltage Engineering Corporation, Burlington, Mass., a corporation of Massachusetts Filed Jan. 16, 1963, Ser. No. 251,976
1 Claim. (Cl. 174—137)

This invention in general relates to high voltage generators and more particularly to means for supporting the high voltage terminal and associated equipment of such a device in physical and electrical isolation within its housing structure.

In the field of high voltage generation, it has always been a principal objective to develop devices capable of producing higher and higher electrical potentials. Consequently, high voltage generators, such as the Van de Graaff electrostatic generator for instance, have evolved from kilovolt machines to devices which are capable of generating electrical potentials of ten million volts and higher. During the course of development of these very high voltage machines, many innovations and novel concepts have been and are being incorporated into a continually changing design. There is, however, one design consideration which appears to be constant; that is, that an increase in terminal voltage requires a commensurate increase in physical size. This is a result of the fact that the high voltage terminal must be insulated from ground potential (usually the generator housing structure). Conventionally, the increased insulation required by an increase in terminal voltage is provided for by (a) increasing the free space distance between terminal and housing structure, and (b) by increasing the size of the insulator which supports the terminal. Because of the nature of voltage breakdown characteristics along the surface of the supporting insulator, a greater distance must be maintained between the terminal and the housing structure in this direction than across the free space gap. Consequently, very high voltage generators are in general physically large, elongated devices which are most advantageously oriented in a horizontal position. Various improvements, such as the polished rounded terminal, the uniform voltage gradient support insulator, and the pressurized insulating gas environment have been employed in an effort to reduce physical size while maintaining effective electrical distance between components. While these measures have in fact resulted in smaller devices for any given voltage, further improvement along these lines would be dependent upon the discovery of more effective insulating materials.

As indicated above, high voltage generators are of necessity developing into very large electrical machines. There are also developing concommitant electrical and structural problems not encountered in lower potential devices, and it is toward the solution of these problems that the present invention is directed. More specifically, these problems relate to supporting the high voltage terminal in electrical isolation within the generator housing. The difficulties encountered in horizontally disposed machines in which long support spans are required are especially acute. The present state of the art is exemplified by Patent No. 2,858,460 entitled Electrostatic Generator issued to L. E. Wilson, Jr. The electrical and mechanical stresses dealt with in the Wilson patent are increased by an order of magnitude and greater in the high voltage generators comprehended by the present invention. Therefore, cantilever construction becomes impossible, and solid support columns, when scaled up to meet electrical requirements, fail of their own weight.

Accordingly, it is a principal object of the invention to provide a new and improved high voltage generator.

It is another object of this invention to provide, in apparatus of the type described, a novel high voltage terminal support structure.

A more specific object of this invention is to provide, in a high voltage generator, a terminal support structure comprising a truss bridge fabricated of insulating material.

Another related object of this invention is to provide such an insulating truss bridge wherein the insulating portions thereof are subjected to stresses of tension and compression only.

These, together with other objects and features of this invention will become more readily apparent from the following detailed description thereof when taken in conjunction with the accompanying drawings in which like parts have been given like reference numerals throughout and wherein.

The novel principles of the present invention will be hereinafter described in conjunction with a tandem particle accelerator. While specific values will be from time to time given as to voltages and dimensions, it is to be understood that the same are by way of illustration only and not to be construed in any limiting sense. It will be obvious to those skilled in the art that the novel concepts of the present invention and especially the insulating support bridge may be scaled up or down or may be adapted to various other similar devices.

Figure 1:
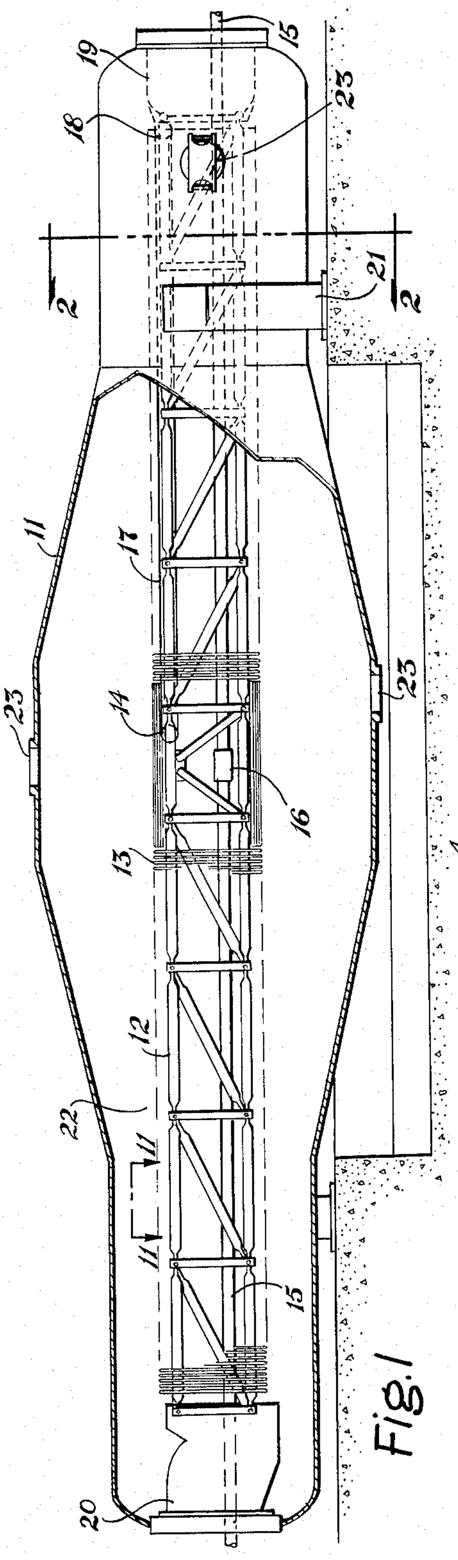
FIGURE 1 is a view, partially in section of a high voltage particle accelerator embodying principles of this invention.
Figures 2, 3, 4:
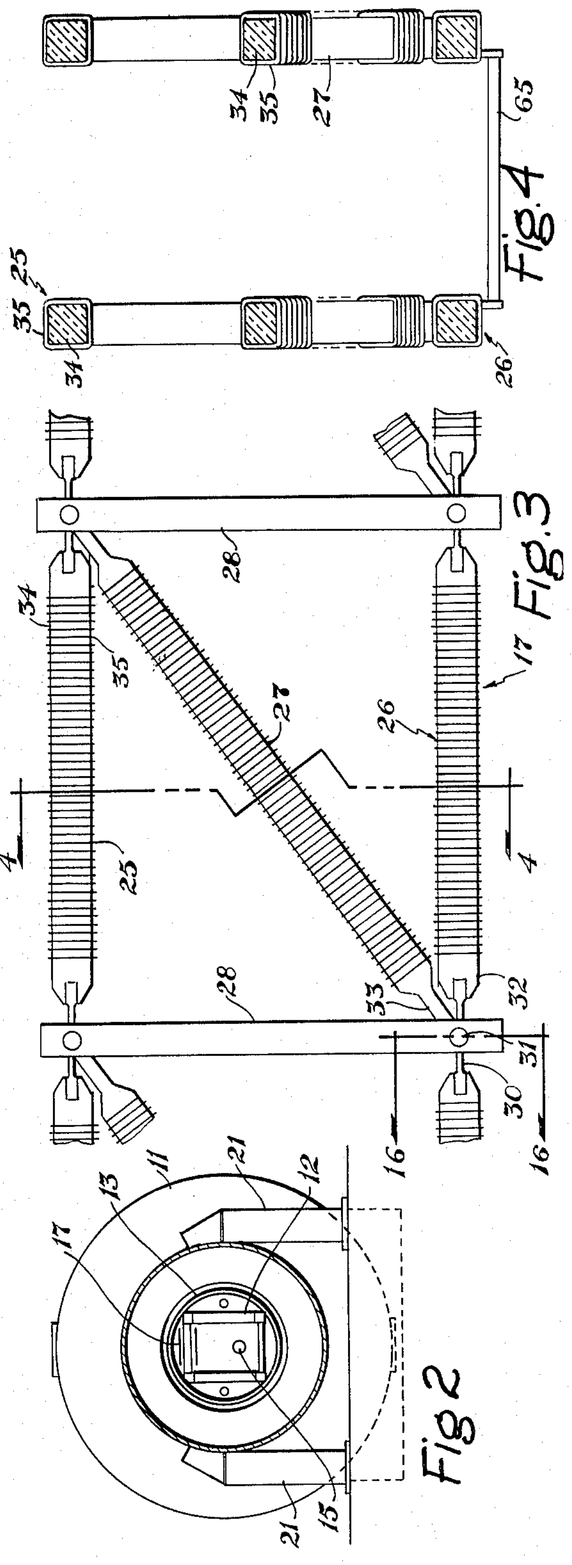
FIGURE 2 is a sectional view of FIGURE 1 taken at 2—2.
FIGURE 3 is a detail of one section of the novel insulating truss bridge comprehended by this invention.
FIGURE 4 is a section of FIGURE 3 taken at 4—4.

Referring now to FIGURES 1 and 2, there is illustrated, in partial section, a tandem particle accelerator of the type referred to above. The tank (or housing member) 11 is shown oriented in a horizontal position and mounted on tank supports 21 over a maintenance pit. Tank 11 is fabricated of metal and has a plurality of manhole ports 23 to provide access to the interior for maintenance personnel. A high voltage terminal 14 is positioned centrally within the tank by means of insulating truss bridge 12. High voltage terminal 14 in general comprises a cylindrical cage of rod-like members and is described in detail in co-pending patent application Serial No. 181,049, filed March 20, 1962 by Christofferson, now Patent Number 3,184,621. In accordance with the principles of electrostatic high voltage generators, the high voltage terminal 14 receives its charge from charging belt 17 which is operated by charging belt drive motor 18. A charged particle beam tube 15 passes longitudinally through the particle accelerator. Charge exchange canal 16 is located within high voltage terminal 14 and bisects beam tube 15. A plurality of stainless steel voltage gradient hoops 13 are disposed uniformly along truss bridge 12. Truss bridge support members 19 and 20 are disposed at the opposite ends of tank 11 and are arranged to maintain a compressive force on the bottom chord members of truss bridge 12. An insulating gas environment such as sulphur hexafluoride is maintained within the tank 11 under pressure. In operation, the particle accelerator operates in the following manner. High voltage terminal 14 is charged to a very high voltage—say in the order of ten million volts by means of charging belt 17. Charged particles of a polarity opposite to that of the polarity of high voltage terminal 14 are directed through charged particle beam tube 15 from one end of tank 11. Because of the difference in polarity between the high voltage terminal and the charged particles, the charged particles are accelerated to the high voltage terminal wherein they pass through charge exchange canal 16. In charge exchange canal 16 the charged particles are stripped of their electrical charge and given an electrical charge that has a polarity the same as that of high voltage terminal 14. Because of the fact that the charged particles have now the same polarity as the high voltage terminal, they are accelerated to an even greater speed and energy as they are repelled from the high voltage terminal through the beam tube to the distal end of the tank.

Referring now to FIGURES 3 and 4, there is illustrated in detail one section of the novel insulating truss bridge of this invention. Top chord member 25, diagonal web member 27 and bottom chord member 26 are fabricated of a plurality of insulating segments and metal plate members. Vertical web members 28 are metal I beams, preferably of steel. At the bridge panel points, the diagonal web members which terminate in end-connectors 33 are connected to the vertical web member by means of connecting pin 31. The chord members are connected through chord end-connectors 32 to flexible connector 30 which is in turn connected to the vertical web member and the diagonal web member by means of connecting pin 31. The inner flange portions of opposing vertical web members are connected at their lower extremity by lateral bracing members 65.

Figure 5:
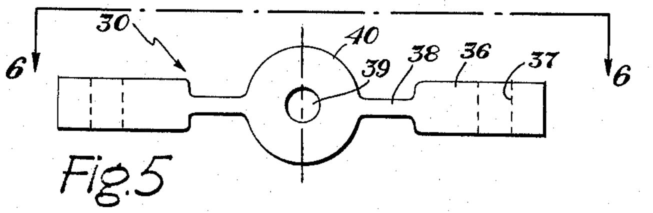
FIGURE 5 is a detail of a member adapted to connect successive chord segments.
Figure 6:
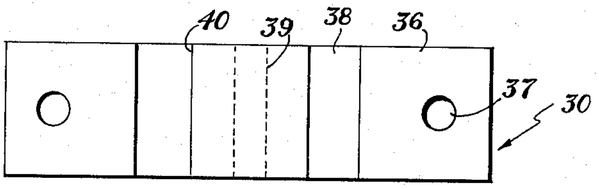
FIGURE 6 is a top view of FIGURE 5 taken at 6—6.

Referring now to FIGURES 5 and 6, there is illustrated, in detail, the flexible connector 30, which constitutes a significant element in the insulating bridge. Flexible connector 30 is fabricated of semi-hardened steel and has flange pads 36 with holes 37 for connection to the chord end-connectors. Connection of the flexible connector 30 to vertical web member 38 is made through centrally disposed hole 39. A necked-down portion 38 is provided on either side of hole 39. Flexible connector 30 as described is fabricated to have sufficient rigidity to support the lateral compression forces acting through it while at the same time having sufficient flex in the necked-down portions 38 to react to any forces which might be incurred from sagging, or heaving of the truss bridge 12.

Figure 7:
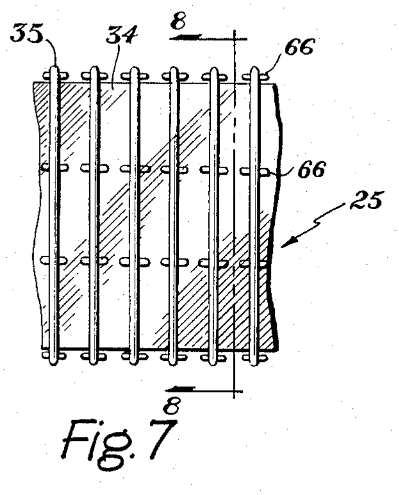
FIGURE 7 is a detail of a truss bridge chord segment.
Figure 8:
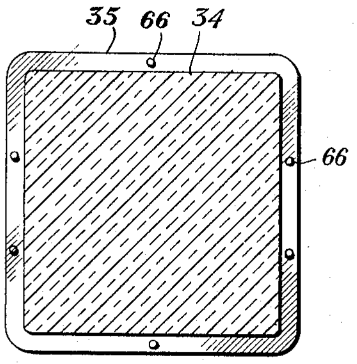
FIGURE 8 is a section of FIGURE 7 taken at 8—8.

The insulating voltage gradient arrangement, which is common to both the web diagonal members and the chord members is illustrated in FIGURES 7 and 8. Metal plate members 35 are glued to insulating segments 34 in alternating sequence as illustrated. The insulating segments are preferably of glass but they may also be fabricated from ceramic or porcelain or other suitable insulating material. Metal plate members 35 are preferably fabricated of stainless steel but may also be fabricated of other metals. A chief consideration in the choice of materials for this section of the insulating bridge is that of choosing materials having similar coefficients of expansion. It is also important that the coefficient of expansion of the vertical web members be compatible with the coefficient of expansion of the composite chord members in order to avoid distortion of the truss sections during temperature changes. The insulating segments during temperature changes. The insulating segments durmetal plate members are glued together by any suitable glass-to-metal or ceramic-to-metal bonding agent such as epoxy A6. The fabrication process includes polishing all surfaces to be bonded, painting the bonding agent on the surfaces of the glass segments, arranging the glass segments and metal plates alternately in a suitable jig, and placing the composite member in compression in a temperature controlled environment for a period of time sufficient to effect adequate bonding. Metal plate members 35 further have a plurality of spark gap members 66 arranged to accommodate electrical surge discharges and to protect the glass column insulator segments.

Figure 10:
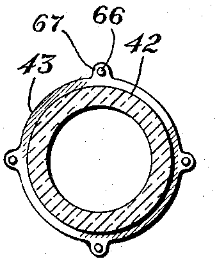
FIGURE 10 is a section of FIGURE 9 taken at 10—10.
Figure 9:
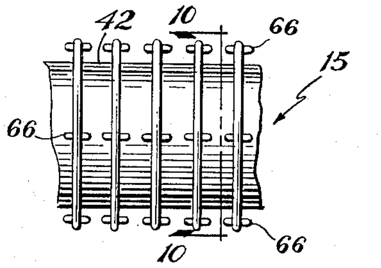
FIGURE 9 is a detail of the particle accelerator beam tube.
Figure 14:
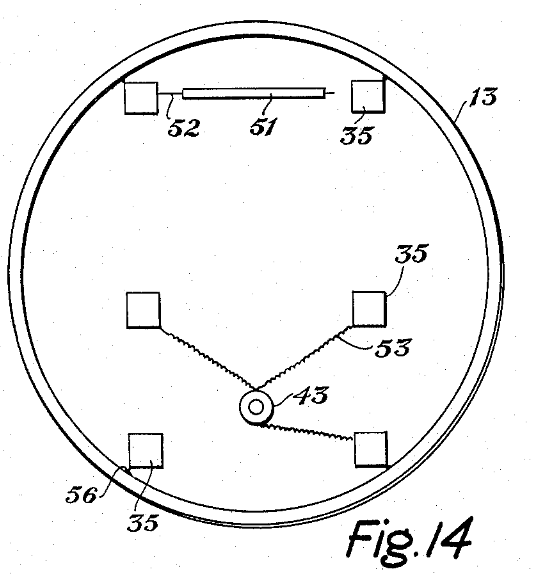
FIGURE 14 is a section of FIGURE 12 taken at 14—14.

The charged particle beam tube is illustrated in detail by FIGURES 9 and 10. Beam tube 15 is a composite member fabricated of alternately arranged metal ring members 43 and annular insulating members 42. Insulating members 42 and metal ring members 43 are fabricated with the same considerations as applied to insulating segments 34 and metal plate members 35 of the above-described insulating chord members. Metal ring members 43 further have protrusions 67 wherein are inserted spark gap members 66. The beam tube 15 is fabricated in the same manner as the insulating chord segments of the bridge structure and annular insulating members 42 are of the same width as insulating segments 34. Therefore metal ring members 43 are made to coincide with metal plate members 35 to establish equipotential planes in the uniform gradient structure hereinafter described.

Figure 15:
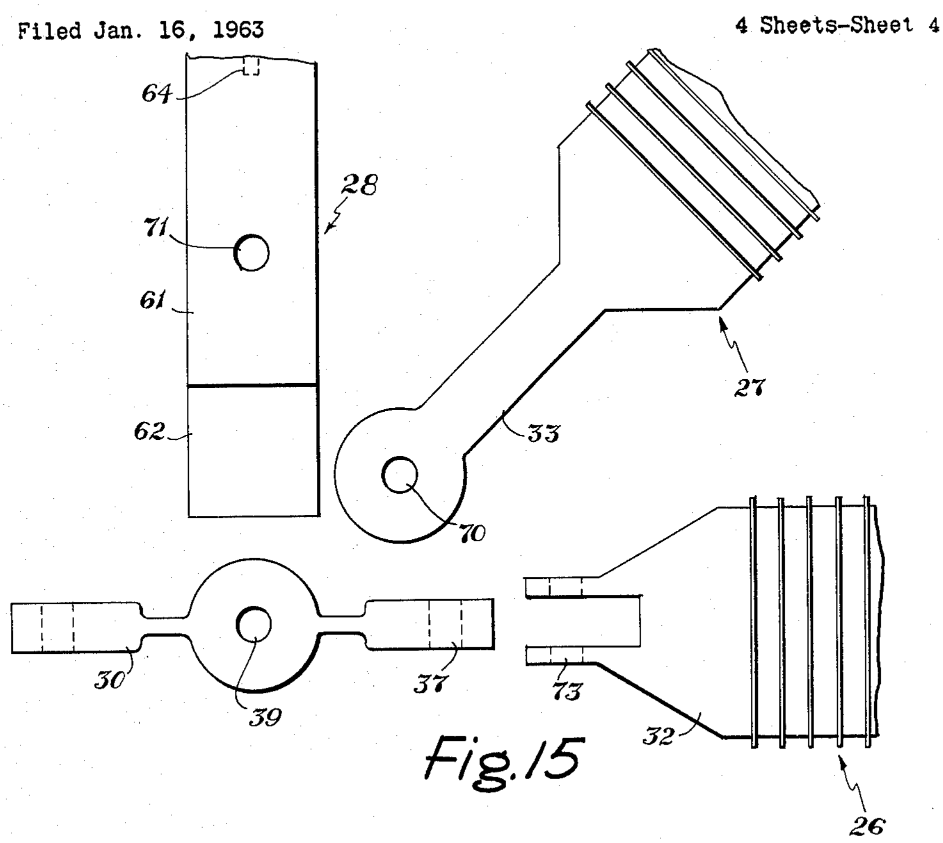
FIGURE 15 is a detail of a bridge panel point.
Figure 16:
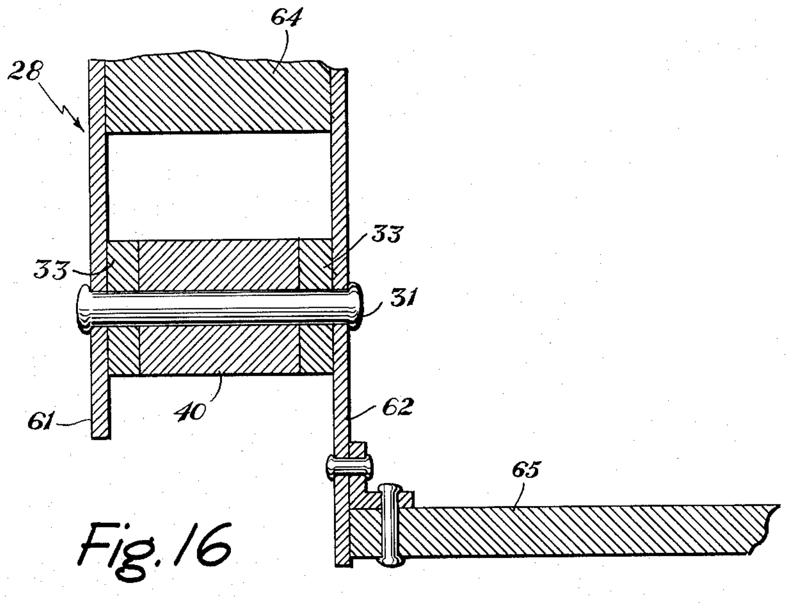
FIGURE 16 is a section of FIGURE 3 taken at 16—16.

Referring now to FIGURES 15 and 16, there is illustrated in considerable detail a panel point of the subject insulating bridge. Diagonal web member end-connector 33 is securred to the end of the diagonal web member and comprises a forked member having holes 70 disposed in the end thereof to accommodate connecting pin 31. The web 64 of vertical web member 28 is removed from the bottom portion thereof. A hole 71 to accommodate connecting pin 31 is bored through outer flange 61 and inner flange 62. Bottom chord end-connector 32 connects to flexible connector 30 by means of a pin through holes 37 and 73. In assembly, connecting pin hole 39 of flexible connector 30, connecting pin hole 70 of diagonal web member end-connector 33, and connecting pin hole 71 of vertical web member end-connector 33 coincide and are connected by means of connecting pin 31. Inner flange 62 is longer than outer flange 61 to accommodate the attachment thereto of lateral bracing 65 and also to permit the attachment of stainless steel voltage gradient hoops 13 to the outer flange 61.

Figure 13:
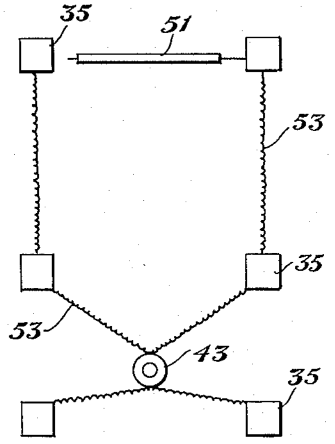
FIGURE 13 is a section of FIGURE 12 taken at 13—13.
Figure 12:
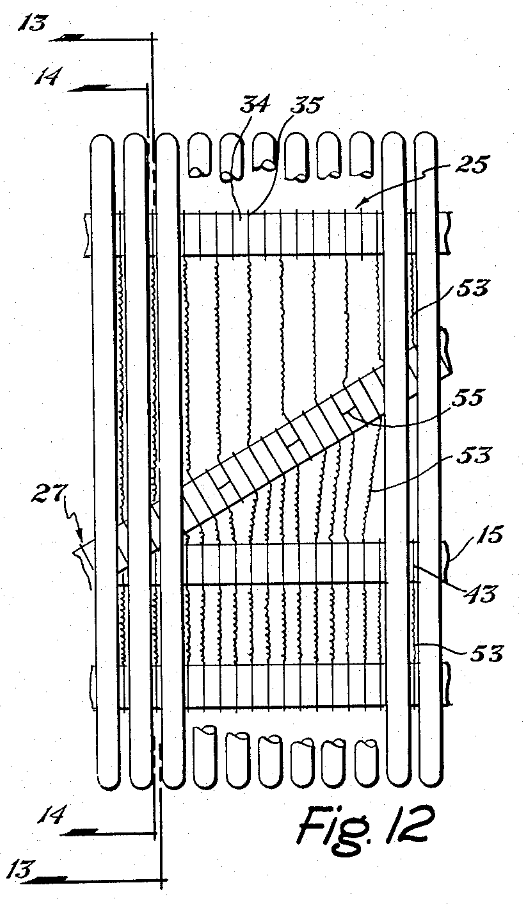
FIGURE 12 is a section of FIGURE 11 taken at 12—12.
Figure 11:
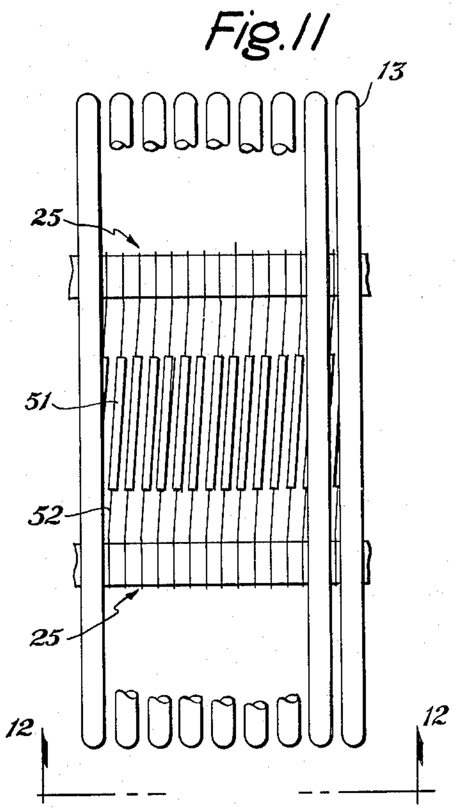
FIGURE 11 is a top view of a portion of the apparatus of FIGURE 1 taken at 11—11.

Electrically a uniform potential gradient is provided along the entire length of the insulating truss bridge 12 in the manner illustrated by FIGURES 11 through 14. Equipotential planes are established between corresponding metal plate members and beam tube metal ring members by means of stainless steel voltage gradient hoops 13 and spring wire connectors 53. A stainless steel voltage gradient hoop 13 is connected to every other bridge metal plate member 35, thereby establishing an equipotential plane through corresponding metal plate members of the top and bottom chord members of the bridge. Spring wire connectors 53 are connected from one of these metal plate members to a corresponding beam tube metal ring member 43 and also to the corresponding diagonal web member metal plate. Equipotential planes between successive voltage gradient hoops are established by means of connecting metal plate members and beam tube metal ring members by means of spring wire connectors 53 as illustrated in FIGURE 13. Inasmuch as diagonal web member 27 is longer than the corresponding top and bottom chord members and consequently includes a greater number of metal plate members, it is necessary to periodically short out successive members by shorting bars 55 as illustrated in FIGURE 12. The uniform potential gradient along the bridge structure is accomplished by means of connecting the successive equipotential planes thus established through resistors 51 as illustrated in FIGURE 11. The uniform voltage gradient established in this way, of course, only extends along that portion of each section of the bridge which includes the alternating glass segments and metal plate members. In the vicinity of the vertical web members a wide equipotential plane exists. It is in this area that the beam tube is supported by the bridge structure. These wide equipotential planes correspond to drift spaces within the beam tube.

Apparatus as described above has been fabricated to operatively produce voltages in the order of 10 million volts. Such a device comprehends a glass insulating bridge of approximately 80 feet in length which is held in compression through a force of 100,000 pounds applied lateraly to the bottom chord members. Through the means of the insulating capabilities and uniform potential gradient facilities described, adequate insulation of the very high voltages has been achieved. Also the novel fabrication techniques, and in particular, the application of the flexible connecting member whereby bending stresses are removed from the fragile glass portions of the bridge have provided mechanical means for maintaining the high voltage terminal and physical isolation.

Inasmuch as various alternative embodiments and applications will occur to those skilled in the art, it is intended that the scope of the present invention be limited by the appended claim only.

I claim:

A truss bridge adapted to support mechanically and to insulate electrically a high voltage terminal, said truss bridge comprising two truss bridge support members; a series of top chord members and a series of bottom chord members, each series extending between said truss bridge support members, each of said chord members being fabricated of rigid insulating segments and being connected to flexible connectors which in turn are connected to a flexible connector of the next adjacent chord member in the series; the point of connection between said flexible connectors being designated a bridge panel point; and rigid diagonal members of insulating material connected at said bridge panel points between said series of top chord members and said series to bottom chord members; whereby forces other than tension and compression are responded to only by said flexible connectors.

References Cited by the Examiner

UNITED STATES PATENTS

| | | | |
|---|---|---|---|
| 419,897 | 1/1890 | Stearns | 14—13 |
| 1,821,736 | 9/1931 | Bohac | 52—648 |
| 2,082,474 | 6/1937 | Van de Graaff | 174—140 X |
| 2,339,098 | 1/1944 | Nagin | 14—13 |
| 2,922,905 | 1/1960 | Van de Graaff | 313—63 |
| 3,067,347 | 12/1962 | Rose | 313—63 |

FOREIGN PATENTS

| | | |
|---|---|---|
| 1,308,957 | 10/1962 | France. |
| 300,169 | 8/1932 | Italy. |

OTHER REFERENCES

New Electrostatic Accelerator by Michael, Berners, Eppling, Knecht et al., The Review of Scientific Instruments, vol. 30, No. 10, November 2, 1959, p. 855.

ROBERT K. SCHAEFER, *Primary Examiner.*

DAVID J. GALVIN, LARAMIE E. ASKIN, JOHN F. BURNS, *Examiners.*

ROBERT F. DZIURGOT,, *Assistant Examiner.*